United States Patent [19]

Kawamura et al.

[11] Patent Number: 4,674,854
[45] Date of Patent: Jun. 23, 1987

[54] INFORMATION SETTING DEVICE FOR CAMERA

[75] Inventors: Masaharu Kawamura, Kanagawa; Kazuhiko Arakawa, Tokyo, both of Japan

[73] Assignee: Canon Kabushiki Kaisha, Tokyo, Japan

[21] Appl. No.: 845,480

[22] Filed: Mar. 27, 1986

Related U.S. Application Data

[63] Continuation of Ser. No. 669,591, Nov. 8, 1984, abandoned.

[30] Foreign Application Priority Data

Nov. 11, 1983 [JP] Japan .................. 58-211902
Nov. 30, 1983 [JP] Japan .................. 58-226282

[51] Int. Cl.⁴ .................. G03B 7/00; G03B 17/18; G03B 7/091
[52] U.S. Cl. .................. 354/289.1; 354/289.12; 354/486; 354/268
[58] Field of Search .................. 354/486, 289.1, 289.11, 354/289.12, 286

[56] References Cited

U.S. PATENT DOCUMENTS

| 4,089,011 | 5/1978 | Date et al. | 354/486 |
| 4,092,656 | 5/1978 | Lang et al. | 354/268 |
| 4,118,716 | 10/1978 | Suzuki et al. | 354/486 |
| 4,165,164 | 8/1979 | Akasuka | 354/289.1 |
| 4,304,482 | 12/1981 | Suzuki et al. | 354/289.1 |

Primary Examiner—Russell E. Adams
Attorney, Agent, or Firm—Toren, McGeady and Goldberg

[57] ABSTRACT

An information setting device in which for a desired photographic information is set as is increased or decreased from the preset value depending on what phase combination the signals of different phase produced in response to manual operation of a photographic information setting member have, the preset value is made to change when the information setting members is turned more than a predetermined angular distance to a click-stopped position.

10 Claims, 11 Drawing Figures

FIG.6B

UP MODE

|     | a | b | c | d | e(a) |
|-----|---|---|---|---|------|
| SWA | 0 | 0 | 1 | 1 | 0    |
| SWB | 0 | 1 | 1 | 0 | 0    |

FIG.6C

DOWN MODE

|     | e(a) | d | c | b | a |
|-----|------|---|---|---|---|
| SWA | 0    | 1 | 1 | 0 | 0 |
| SWB | 0    | 0 | 1 | 1 | 0 |

FIG.7

|     | a | b | c | d | a | b | c | d | a | b | c | d | a |
|-----|---|---|---|---|---|---|---|---|---|---|---|---|---|
| SWA | 0 | 0 | 1 | 1 | 0 | 0 | 1 | 1 | 0 | 0 | 1 | 1 | 0 |
| SWB | 0 | 1 | 1 | 0 | 0 | 1 | 1 | 0 | 0 | 1 | 1 | 0 | 0 |
|     |   |   |   |   |   |   |   |   |   |   |   |   |   |
| I   | △ |   |   |   | △ |   |   |   | △ |   |   |   | △ |
| II  | △ |   | △ |   | △ |   | △ |   | △ |   | △ |   | △ |
| III |   |   | △ |   |   |   | △ |   |   |   | △ |   |   |
| IV  |   | △ |   |   |   | △ |   |   |   | △ |   |   |   |
| V   |   | △ |   | △ |   | △ |   | △ |   | △ |   | △ |   |
| VI  |   |   |   | △ |   |   |   | △ |   |   |   | △ |   |

INFORMATION SETTING DEVICE FOR CAMERA

This is a continuation of application Ser. No. 669,591, filed Nov. 8, 1984, now abandoned.

BACKGROUND OF THE INVENTION

1. Field of the Invention

This invention relates to information setting devices for cameras having a dial-like selector by which photographic information such as shutter speeds, aperture values, or exposure modes are set in.

2. Description of the Prior Art

To allow for whatever shutter speed or aperture or any other exposure factor the photographer wishes to be set in the camera, there has been known a first method of setting shutter speeds or apertures all the way from the minimum to the maximum value in a single selector or dial operatively connected to a variable resistor having its resistance value related to the selected value of such exposure factor. Another method is that the variable resistor is replaced by a code plate with a scanner therefor to produce a corresponding digital output for the selected value of the exposure factor. Another or third method is by using two push buttons and a display. If the preliminarily set value on the display is different from a desired one, the photographer needs only to push either one or the other of the buttons to either step-up or step-down from the preliminary set value until the desired value appears in the display.

However, these prior known methods have large drawbacks. That is, in the first method, because, of its use of the variable resistor, an increase in the accuracy of increment of values, calls for high precision variable resistors. When employing commercially available variable resistors, therefore, it is necessary either to separate the good items from the bad, or to correct the resistance value of the used variable resistor by using an adjusting resistor. This leads to increases in the production cost. Another drawback is that to establish a high precision accuracy variable resistor, it is very difficult to locate the slider within required severe tolerances. The second method also has a drawback in that as the photographic information to be set in digital form is necessarily a word of usually not less than 3 bits, when the number of bits is intended to increase, the size of the electrode pattern of the coded plate unavoidably increases. Also to apply the output of the code plate to an exposure value computer, usually of IC form, there is a need to provide an equal number of output lines to the number of bits. In addition thereto, this unavoidably increase the number of pins of the IC, making it difficult to perform actual installation. For these reasons, the employment of the second method is not preferable to small size instruments, such as cameras. A common drawback of the first and second methods is that since all the numerical characters representing the available values of shutter time or aperture must be written on the dial, as the number of available values increases, the size of each of the numerical characters decreases so that it is difficult for the photographer to read the scale on the dial. This drawback is serious when whether or not the manageability is good, constitutes a large factor of appraisal as in cameras or like instruments. In the third method, due to the digital display, the two switches for the push buttons suffice for constructing the selector, giving a great advantage of simplifying its structure. In the case of the display within the viewfield of the finder of the camera, however, the photographer is obliged to do the work by using two fingers of his one hand under the condition that an additional finger of the same hand controlls the operation of the light metering start switch while looking through the finder. The third method also had a drawback that the selecting is a difficult operation. Particularly with cameras having a release button which also serves as the actuator for the aforesaid light metering start switch when it is pushed down to a first stroke where the display is also rendered operative, the photographer usually employs his index finger for actuation of the release button, and another finger for pushing the UP button or DOWN button. In doing so, it often happened that the release button is fully pushed down to a second stroke at a time during the photographic information selecting operation. Thereby an improper exposure results.

Attempts have been made to eliminate such drawbacks by techniques disclosed in Japanese Laid-Open patent applications Nos. SHO 58-63932 and SHO 58-63933, wherein use is made of two signals of different phase from each other, and the direction in which the photographic information selector is turned is detected by sensing the phases of the signals to perform addition or subtraction with the value set in the preceding selecting operation.

In the case of the technique disclosed in the above-identified patent applications, however, the selector has points in position at which either one or both of the aforesaid two signals changes or change their phases. When the selector is manually moved across any of these points, therefore, the setting of values of exposure factor is caused to suddenly shift. If the selector is handled in such a fashion as to swing clockwise and counter-clockwise past the point, the display changes for every time, giving a drawback that as it flickers, the efficiency of setting is hampered. Also due to chattering between the contacts of the switch, there is produced a similar problem. This problem is prominent particularly when the selector moves past each of the transit points of the set value, as the selector is operatively connected to mechanical switches. When in the manual exposure mode, such problem results in taking photographs of incorrect exposure.

SUMMARY OF THE INVENTION

With such conventional drawbacks in mind, it is, therefore, an object of the invention to allow for alteration of the preset value to take place only when an information selector is manually moved by an appreciable distance.

Another object is to provide the information selector with click stops each at the center of the distance the selector moves to shift the setting one stop, with an advantage of improving the efficiency and reliability of settings.

BRIEF DESCRIPTION OF THE DRAWINGS

FIG. 6B is a table of a cycle of binary coded phases of the switches SWA and SWB when the dial turns in UP mode.

FIG. 6C is similar to FIG. 6B except that the dial turns in DOWN mode.

FIG. 7 is a diagram illustrating relationships between the positions of the click stops and electrode patterns.

DETAILED DESCRIPTION OF THE PREFERRED EMBODIMENTS

Figure 1:
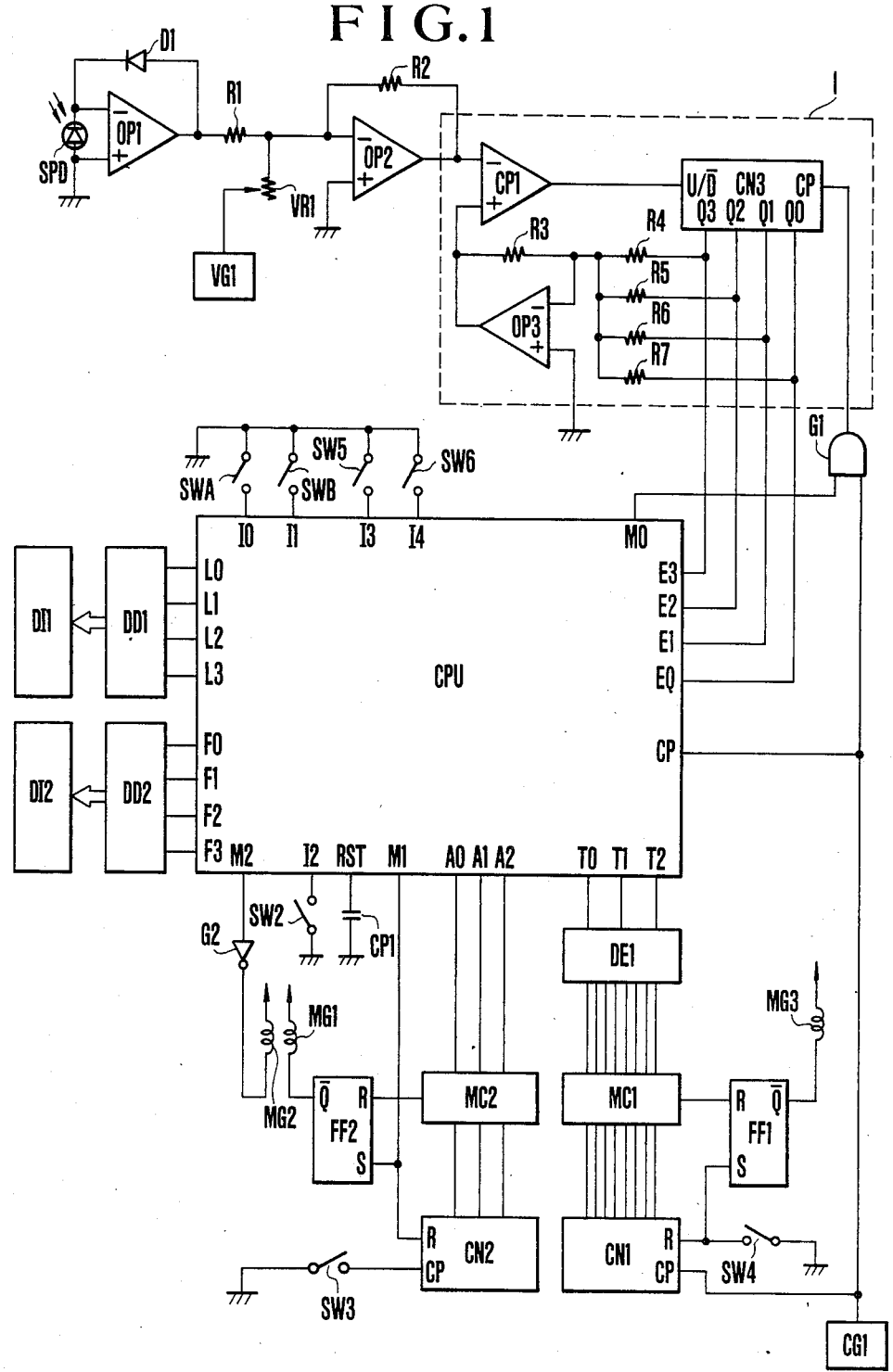
FIG. 1 is a block diagram of the circuitry of an embodiment of an information setting device according to the present invention.
Figure 6A:
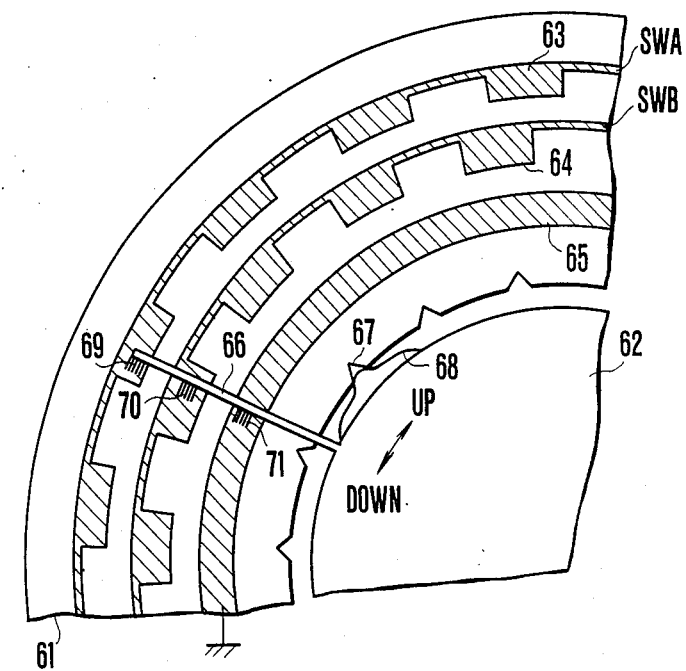
FIG. 6A is a fragmentary plan view of switches SWA and SWB on the lower surface of the selector or dial of FIG. 4.

In FIG. 1 there is shown one embodiment of the invention where a photosensitive element SPD is connected across inputs of an operational amplifier OP1 with a diode D2 in the feedback network thereof for producing an output in the form of an Apex value Bv proportional to the logarithm of the brightness of an object to be photographed. A constant voltage source VG1 is connected to a variable resistor VR1 having a resistance val related to the sensitivity Sv of the film being used. The object brightness Bv from the operational amplifier OP1 and the film sensitivity Sv from the variable resistor VR1 are computed by an adder OP2 to obtain an exposure value Ev. A comparator CP1, an UP/DOWN couner CN3, resistors R3 to R7 and an adder OP3 constitute an A/D converter I. A microcomputer. CPU has an output port MO connected to one of two inputs of an AND gate G1 which is provided between a clock generator CG1 and the clock terminal of the counter CN3. Switches SWA and SWB are constructed with a code plate andtrespective brushes, as shown in FIG. 6A, to detect which of the UP and DOWN modes is operated, and are connected, respectively, to input ports I0 and I1 of the CPU. A switch SW5 is arranged to turn on when each cycle of film winding operation is completed. An exposure mode selector or switch SW6 has an ON position for shutter speed priority exposure mode, and an OFF position for aperture priority exposure mode. A binary coded decimal decoder DE1, receptive of shutter speed information from output ports T0, T1 and T2 of the CPU, produces an output of expanded duration equal to an actual shutter time. A switch SW4 is arranged to close when the leading curtain of the shutter starts to run down. Responsive to closure of the switch SW4, a counter CN1 starts to count clock pulses from the generator CG1. The output of the counter CN1 is compared with the output of the decoder DE1 by a magnitude comparator MC1. The output of the magnitude comparator MC1 is connected to the RESET terminal R of a flip-flop FF1, of which the SET terminal is connected to the leading curtain start detecting switch SW4 so that the period of actuation of an electromagnet MG3 for holding the trailing curtain of the shutter in the latched position is controlled. As a diaphragm of a photographic lens is closing down, a switch SW3 turns on and off repeatedly, producing a train of pulses, which are counted by a counter CN2. The output of the counter CN2 is compared with aperture information, produced from output ports A0, A1 and A2 of the CPU, by a magnitude comparator MC2. The diaphragm is stopped from further closing down when the current supply to a magnet MG1 is cut off. This current supply is controlled by a flip-flop FF2 which is reset by a signal from a terminal M1 of the CPU before the release button is depressed to a second stroke to start a releasing operation of the camera. The sequence of mechanical operations of the camera begins with an upward movement of a mirror as it is released from a latched connection by a magnet MG2. A decode driver DD1 converts a signal from out ports L0, L1 and L2 of the CPU to data to be displayed by display DI1. The display DI1 is provided in the top panel of the camera housing as will be described later. Another decode driver DD2 converts a signal from output ports F0, F1, F2 and F3 OF the CPU to data to be displayed by DI2. The display DI2 is provided in the interior of the finder of the camera as will be described later. It is to be noted that though, in this embodiment, any value of either shutter speed or aperture can be represented by a 3-bit word, because the number of selectable values is limited to 8, an 8-bit register is used for storing the photographic information.

Figure 4:
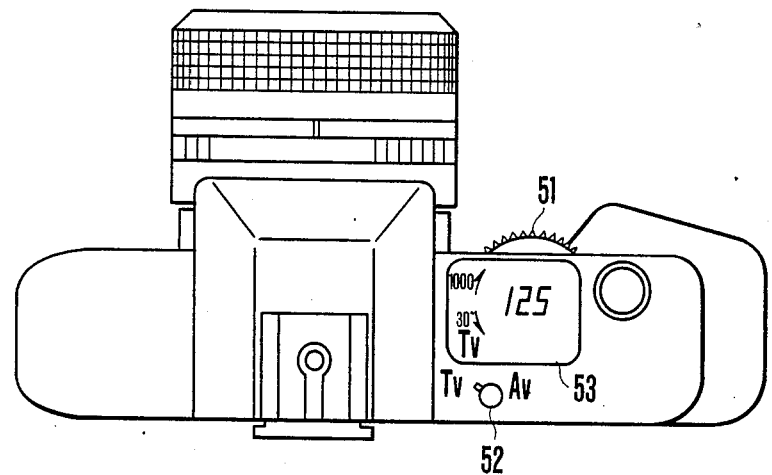
FIG. 4 is a top view of a camera employing the device of the invention.

FIG. 4, in a view looking from the above, illustrates the outer appearance of the camera employing one form of the present invention, where a dial 51 and an exposure mode selector 52, having shutter speed priority and aperture priority mode positions, are arranged near the aforesaid display DI1 at 53.

Figure 5:
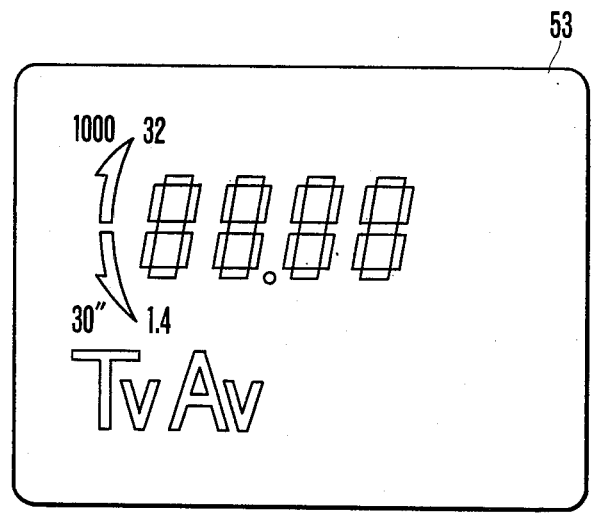
FIG. 5 is a plan view in enlarged scale of the display of FIG. 4.

FIG. 5, in enlarged scale, illustrates the details of the display DI1. When the shutter speed priority mode is set by the selector 52, a symbol Tv, two arrow marks of opposite direction, numerals 1000 and 30" and a time value in four 7-segment display elements are selected to be driven. When the aperture priority mode is set in, another symbol Av, the two arrow marks, numerals 32 and 1.4 and an aperture value in the four 7-segment display elements are selected to be driven.

The dial 51 is associated with the switches SWA and SWB of which the construction and operation will next be described with reference to FIGS. 6A, 6B and 6C. In FIG. 6A, the switch SWA is constructed with a number of electrode patches 63 connected to each other and arranged integrally on a circle in equally spaced relation on a disc 61 fixedly secured to the camera housing, an inner electrode 65 concentric to the circle of the electrode patches 63 and connected to circuit ground brushes 69 and 71 respectively riding on the circles 63 and 65 and borne by an arm 66 radially extending from a rotary member 62 fixedly secured to the lower surface of the dial 51. The second switch SWB is constructed with the equal number of electrode patches 64 to that of SWA, connected to each other and arranged in an intermediate circle in equally spaced relation on the disc 61, the common circular electrode 65, and a brush 70 and the common brush 71 respectively riding on the circles 64 and 65 and borne on the common arm 66. The patches 63 of the first switch SWA and the patches 64 of the second switch SWB are positioned out of radial alignment with each other to form a number of cycles of four different phases. At the end of the length of each cycle there is provided a click stop comprising a recess 67 formed in an inner edge of the disc 61 and a common leaf spring 68 mounted on the rotary member 62.

When the dial 51 is turned from the click-stopped position of FIG. 6A in a clockwise direction indicated by arrow UP as viewed in FIG. 6A to the next click-stopped position, the switches SWA and SWB change their phase as follows. At first, because the rotary member 62 responsive to the dial 51 is in the click-stopped position, the brushes 69 and 70 of the switches SWA and SWB are on the respective patches 63 and 64, thereby two signals of binary sequence "0,0" are produced, as indicated in column "a" of FIG. 6B.

As the dial is turned in the direction of the arrow UP along with the rotary member 62, when the brush 70 moves away from the patch 64, the binary sequence changes to "0,1" as shown in column "b" of FIG. 6B. Then, when the other brush 69 moves away from the patch 63, the binary sequence further changes to "1,1" as indicated in column "c" of FIG. 6B. Then when the first brush 70 comes to contact with the next patch 64, the binary sequence changes to "1,0" as indicated in column "d" of FIG. 6B. As the next click-stopped position is reached, when the second brush 69 also comes again to contact with the patch 63, the binary sequence "0,0" repeats as indicated in column "e(a)" of FIG. 6B.

The operation of the setting device of the invention will next be described by reference to the flowcharts of FIGS. 2 and 3. In this embodiment, as has been mentioned above, the shutter speed and aperture each are made settable in eight discrete values which are treated in the interior of the CPU in the form of corresponding decimal words 0, 1, 2, 3, 4, 5, 6 and 7. Now when the release buttom is pushed to a first stroke to close a power switch (not shown), it is, as an initial setting, that an intermediate one of the aforesaid values is automatically set. Therefore, 3 is stored in the 8-bit register RA. This is carried out in Step 1 of the flowchart. It is to be noted that the value to be initially set is preferably of a highest frequency of use in ordinary photographic situations.

Step 2: The output port MO produces "1" by which the gate G1 is opened to pass the clock pulses from the clock generator CG1 to the counter CN3, causing the A/D converter I to start an A-to-D converting operation.

Step 3: Whether or not the cycle of film winding operation of the camera is completed is detected from information at the input port I3 which is connected to the switch SW5.

Step 4: Here the flow diverges to Step 5 if the information at the input port I3 represents that the cycle of film winding operation has been completed, and to Step 7 if it is detected that the film winding operation is not yet completed.

Step 5: as the termination of the film winding operation is detected, whether or not the release button is in the second stroke is then detected from information at the input port I2 which is connected to the switch SW2.

Step 6: Here the flow diverges to Step 7 if the information at the input port I2 represents that the second stroke of the release button is not ON, and to Step 18 if it is ON.

Next, the content of Step 7 is described in detail by reference to FIG. 3. In connection with FIG. 3, it is to be noted that the binary sequence of the signals at the input ports I0 and I1 is written in the order of I1, I0. In step 7, to begin with, whether or not the switches SWA and SWB are ON is detected from information at the input ports I1 and I0 (Step 7-1). Note, as shown in FIG. 1, the input port I0 is connected to the SWA, and the other input port I1 is connected to the SWB.

Step 7-2: If the signals at the input ports I1, I0 both are 0,0, this implies that the dial is stable due to the click stop as shown in FIG. 6A, and step 8 is executed. If not 0,0, the flow is branched to Step 7-3.

Step 7-3: The test to determine whether the input ports I1, I0 is 1,0, that is, SWB is OFF and SWA is ON. When the up mode is operated by turning the dial in the forward or clockwise direction, the binary sequence varies in a direction from the state "a" through the state "b" until the state "e". This causes the input ports I1, I0 to change from 0,0 to 1,0. Therefore, if I1, I0=1,0, an up mode loop begins with step 7-5. If not, a down mode loop begins with Step 7-4.

Step 7-5: I1, I0 are again brought in.

Step 7-6: Whether or not they are still as state "b" is again verified. If so, return to Step 7-5. So long as the state "b" continues, a loop of Steps 7-5 and 7-6 repeats itself. This is because the dial is moved by hand, for a waiting time is implemented by this loop.

Assuming here that the dial is further turned in the forward direction, then the input ports I1, I0 change from 1,0 to 1,1 as shown from the state "b" to the state "c" of FIG. 6B.

Step 7-7: Whether or not the dial is further turned in the forward direction is examined by the test to determine whether the input ports I1, I0 are 1,1. If the dial is reversely turned to cause I1, I0 to return from 1,0 to 0,0 and not to become 1,1, a jump is made to Step 8 of FIG. 2. If the direction of further rotation of the dial is forward with a change of the input ports to 1,1, Step 7-8 follows:

Steps 7-8 and 7-9 are performed for a similar purpose to that of Steps 7-5 and 7-6. When the dial is further turned in the forward direction, the input ports I1, I0 change from 1,1 to 0,1.

Step 7-10: Whether or not the dial is further turned in the forward direction is, therefore, examined by the test to determine whether the input ports I1, I0 are 0,1. If it is here that the dial is reversely turned, the input ports return from 1,1 to 1,0. Therefore, a jump is made back to the state b-discrimination routine or Step 7-5. If rotation of the dial is forward, the input ports change from 1,1 to 0,1, causing the flow to transfer to Step 7-11.

Steps 7-11 and 7-12 are carried out to examine whether or not the turning of the dial proceeds likewise as in the loop of Steps 7-8 and 7-9 and the loop of Steps 7-5 and 7-6.

When the dial is further turned in the forward direction and arrives at the next click-stopped position, the input ports I1, I0 change from 0,1 to 0,0, as shown from the state "d" to the state "e" of FIG. 6B.

Step 7-13: Whether or not the dial is further turned in the forward direction is, therefore, examined by the test to determine whether the input ports I1, I0 are 0,0. If it is here that the dial is turned backward, the input ports return from 0,1 to 1,1, causing the state c-discrimination routine or Step 7-8 to start again. If the forward turning of the dial proceeds, the input ports change from 0,1 to 0,0, Step 7-14 follows:

Step 7-14: Add 1 to the data in the register RA. On assumption that the program began with Star because the content of the register RA is set at 3, the execution of Step 7-14 results in an increment of the register RA to 4, and also in transfer to Step 8 of FIG. 2. Thus, the loop for the test to determine whether the up mode is operated which began with Step 7-5 is terminated.

Returning again to Step 7-3, if the input ports are verified not to be 1,0, that is, not to be the state "b" of FIG. 6B, it seems that the dial has been turned either backward to the state "d", or forward from the state "a"

past the state "b" to the state "c", or backward from the state "a" past the state "d" to the state "c". Since the CPU, however, executes the program at a very high speed, however fast the dial may be manually moved, there is almost no possibility for the CPU to skip over one step from that for the state "a" to that for the state "c". Therefore, after the input ports I1, I0 have been verified to be 0,0 in Step 7-2, when, in the next cycle, this is denied, the dial often takes the state "b" or the state "d" as changed from the state "a". Therefore, if the input ports are determined not to be the state "b", Step 7-3 is followed by Step 7-4 for the test to determine whether the input ports are changed to 0,1 representing the state "d". If the dial is in the state "d", Step 7-16 follows: If not, the flow is branched to Step 7-15. Steps from 7-16 to 7-27 form a "down" mode examination loop which is similar to the "up" mode examination loop except the binary sequence changes in different order. Accordingly, no more detailed explanation is given here.

It is to be noted here that Step 7-25 is a command of subtracting 1 from the data in the register RA. That is, because the selection of the down mode is detected by executing the loop of Steps from 7-16 to 7-24, the preset value of exposure factor is decreased by one step.

A jump made to Step 7-15, though it being rare as has been mentioned above, results in the impossibility of determining which of the up and down modes is selected.

Step 7-15: Therefore, information at the input ports I1, I0 is first brought in.

Step 7-26: The test to determine whether the dial is in the state "c". If the input ports I1, I0 are 1,1, return to Step 7-15. If not, advance to Step 7-27.

Step 2-27: The test to determine whether the input ports I1, I0 are 1,0 representing the state "b". If so, transfer to a midpoint in the down mode examination loop at Step 7-22. If not, transfer to a midpoint in the up mode examination loop at Step 7-11.

In such a manner, depending upon the detected one of the up and down modes, the initial setting of exposure factor stored in the register RA is incremented or decremented.

Turning again to FIG. 2, since the appearance of "1" at the output port MO of the CPU in Step 2, the counter CN3 of FIG. 1 is converting the analog exposure value Ev to a digital value in response to the output of the comparator CP1.

Step 8: The output of the A/D converter I is then brought in the CPU at the input ports E0 to E3 after the termination of execution of Step 7.

Step 9: The selected value of exposure factor by the dial as set in the photographic information register RA is subtracted from the analog-to-digital converted exposure value, and the result is stored in a register RB.

Step 10: The information representing which of the shutter speed priority and aperture priority exposure modes is selected by the switch SW6 is brought in from an input port I4.

Step 11: If the exposure mode is determined to be the shutter speed priority mode from the information of the input port I4, Step 12 follows. If it is the aperture priority, mode the flow is branched to Step 14.

Step 12: AND's the value in the register RA and 07. When the result is stored in a register RC, the 4-th bit counting from the least significant bit in the register RC becomes "0".

Step 13: OR's the value of the register RB and 08. When the result is stored in a register RD, the 4-th bit counting from the least significant bit of the register RD becomes "1".

Step 14: OR's the value of the register RA and 08. When the result is stored in the register RC, the 4-th bit counting from the least significant bit of the register RA becomes "1".

Step 15: AND's the value of the register RB and 07. When the result is stored in the register RD, the 4-th bit counting from the least significant bit of the register RB becomes "0".

That is, by executing each of the sequence of Steps 12 and 13 and the sequence of Steps 14 and 15, and examining the 4-th bits of the registers RA and RB, it is made possible to determine which of the shutter speed value information and aperture value information the contents of the registers represent.

It is also to be noted that in the present embodiment, the shutter speed value information and the aperture value information each are defined by the last three bits of the 8-bit register But, some of the computation result may take four or more bits to define To allow for this, many useful measures are known. No explanation is made about it, because it is not essential to the present invention.

Step 16: The result obtained either in Step 12 or in Step 14 is produced at the output ports L0 to L3, and displayed by the display DI1 when it is driven by the decoder DD1.

Step 17: The result obtained in either Step 13 or Step 15 is produced at the output ports F0 to F3 and displayed by the display DI2 when it is driven by the decoder DD2.

Thus, one sequence of operations "information input→computation→display" is completed. To carry out next sequence, the same program, beginning with Step 3, is executed again to present the display of the selected value of exposure factor by the dial and the display of the computed exposure value. Therefore, the photographer first sets a desired one of the shutter speed priority and aperture priority exposure modes by the switch SW6 and then sets a desired value of shutter speed or aperture by the dial while looking at the display DI1 in the top panel of the camera housing. The exposure value derived from that set value of exposure factor, the object brightness and the sensitivity of the film in use can be seen at the display DI2 in the field of view of the finder.

After that, with the camera in the film wound-up position, when the photographer presses the release button from the first to the second stroke, the aforesaid flow takes a route from Step 4 through Steps 5 and 6 to Step 18.

Step 18: The CPU then changes its output signal MO from "1" to "0", causing the AND gate G1 to close and therefore causing the clock pulses to stop from entering the counter CN3.

Since the light value Ev, in the form of the digital output at the terminals Q0 to Q3 of the counter CN3, is latched, despite the fact that the mirror was moved upward to and maintained in the non-viewing position during the exposure where no light entered the photosensitive element SPD to permit the output of the operational amplifier OP1 to be lowering, there is no possibility of presenting a faulty display even when it is done soon after the termination of the exposure, because the light value which was obtained just before the initiation of the exposure is held in the counter CN3.

In the case of the shutter speed priority mode, Step 12 has stored "0" in the 4-th bit counting from the least significant bit of the register RC, and in the case of the aperture priority mode, Step 14 has stored "1" in the 4-th bit counting from the least significant bit of the register RC.

Step 19: The value that the 4-th bit, counting from the least significant bit, of the register RC has is determined. If the mode is the shutter speed priority, mode Step 20 follows. If the aperture priority, mode the flow is branched to Step 21.

Step 20: The content of the register RC, which was obtained by computation in Step 12, or the preset value of shutter speed, is placed onto the output ports T0 to T2, and the content of the register RD, which was obtained by computing the light value Ev and the preset value of shutter speed, or the computed value of aperture, is placed onto the output ports A0 to A2.

Step 21: As opposed to Step 20, the content of the register RC is placed onto the output ports A0 to A2, and the content of the register RD is placed onto the output ports T0 to T2.

Step 22: The CPU produces "1" at the output port M1, thereby the counter CN2 is reset and the RS flip-flop FF2 is set. Therefore, the diaphragm control magnet MG1 is supplied with electrical power to release a diaphragm closing-down lever from the connection with a latch member.

Step 23: The CPU changes its signal M1 from "1" to "0", causing the counter CN2 to release from the resetting. Since the output $\bar{Q}$ the RS flip-flop FF2 remains unchanged, the current supplied to the diaphragm control magnet MG1 continues.

Step 24: The CPU produces "8 the output port M2, thereby a first latch magnet MG2 is supplied with electrical power, initiating upward movement of the mirror through a mechanism (not shown), and, at the same time, initiating a closing operation of the diaphragm of the photographic lens.

Step 25: The CPU changes its signal M2 from "1" to "0", causing de-energization of the first latch magnet MG2.

As a brush is driven by the closing down lever to scan a comb-like electrode, the switch SW3 turns on and off, producing an ever-increasing number of pulses which are counted by the counter CN2. The output of the counter CN2 is compared with the aperture value, in the form of the output at the output ports A0–A2 of the CPU, by the magnitude comparator MC2 which, upon coincidence, produces "1". Responsive to this, the RS flip-flop FF2 resets itself, cnanging its output $\bar{Q}$ to "1", thereby the magnet MG1 is de-energized to arrest the closing down lever. Thus, the size of aperture opening of the diaphragm is automatically adjusted to either the presetting or the exposure value.

After the upward movement of the mirror and the automatic adjustment of the diaphragm aperture have been completed, a mechanism (not shown) automatically releases the leading curtain of the shutter to run down, initiating an exposure, and turns on the switch SW4. be noted that before the switch SW4 is turned on, the counter CN1 and RS flip-flop FF1 are both reset. When the switch SW4 turns on, the counter CN1 starts to count pulses from the clock generator CG1. The output of the counter CN1 is compared with the shutter speed information at the output ports T0, T1 and T2 of the CPU by the magnitude comparator MC1 upon coincidence to produce "1". Responsive to this, the RS flip-fl FF1 resets itself, changing its output $\bar{Q}$ to "0", thereby the magnet is energized to release the trailing curtain of the shutter from the latching connection. Thus, the exposure is terminated. When the shutter is closed, the switch SW5 turns off.

Step 26: Whether or not the film is advanced one frame is examined by sensing the output of the switch SW5 applied to the input port I3.

Step 27: The test to determine whether the advancing of the film is completed. If not, the information at the input port I3 is sensed again. If so, the flow returns to Step 2.

Though the foregoing embodiment of the invention has been described in connection with the arrangement of the displays DI1 and DI2, respectively, in the top panel of the camera housing and in the finder, both of the displays may be positioned either near the selector dial 51 so that the preset value of exposure factor and the computed exposure value can be seen at a time from the outside of the camera housing, or in the field of view of the finder. Also, in addition to the indicia to be displayed as shown in FIG. 5, a one-step under and one-step over numeral than the 4-digit numeral displayed by the seven-segment display elements may be displayed, in the case of the shutter speed, at locations coincident with 1000 and 30" respectively, and, in the case of the aperture, at locations coincident with 32 and 1.4 respectively. This can be done easily by slightly modifying the docoders DD1 and DD2 and the display elements. Also the foregoing embodiment has been described as applied to the shutter speed or aperture information input device. But the present invention is not confined thereto, and may be applied to data setting devices for the film frame counter and the data recorded, for example. Also though, in the illustrated embodiment of the invention, the encoder on the selector dial is constructed by using circular electrodes and sliders therefor, the phase of rotation of the selector dial may be otherwise detected by using optical means with a photo-interpreter, or by using magnetic means with a magnetic resistance element.

What is indexed by the click stop is the one of the four phases in each cycle of the electrode pattern which provides signals of binary 0,0 as shown by triangle marks on a first horizontal line I of FIG. 7. This should be also taken as illustrative, and may be varied as shown on the lines III, IV and VI of FIG. 7, with corresponding alterations of the program. It is also to be noted in connection with the lines I, III, IV and VI of FIG. 7, that the switches SWA and SWB are click-stopped once for every four phases in each cycle across which the selector turns to effect shifting of the set value on step. Another example of variation is, therefore, that the switches SWA and SWB are click-stopped once for every two phases, as shown on lines II and V of FIG. 7, while the program of FIG. 3 is necessarily varied so that the set value of exposure factor is shifted one step each time the tests each to determine whether the switches SWA and SWB moved by one phase are carried out.

Another embodiment of the present invention is next to be described, which has an additional capability of preventing the set value of exposure factor from being accidentally changed when the photographer unintentionally touches the selector and is not aware of the fact that the position of the selector has changed. Even with the provision of such capability, the possibility of accidentally setting a different value from the desired one due to the unstable positioning of the selector out of the clicked indexing cannot be reduced to zero. Another additional capability is, therefore, that when the selector is out of the click-stopped position, a camera release, despite the shutter release button being pushed down from the first to the second stroke, has to be prevented from being actuated thereby it being made possible for the photographer to shoot pictures without suffering from an unexpected change of the setting of exposure factor and to carry out always efficient and reliable settings of desired values of exposure factors so that as right an exposure as intended by the photographer can be made at any time.

In such embodiment, those of the parts which have been described in connection with FIGS. 1, 4, 5, 6A, 6B, 6C and 7 are used without any alteration, and their explanation is no more given below.

Figure 2:
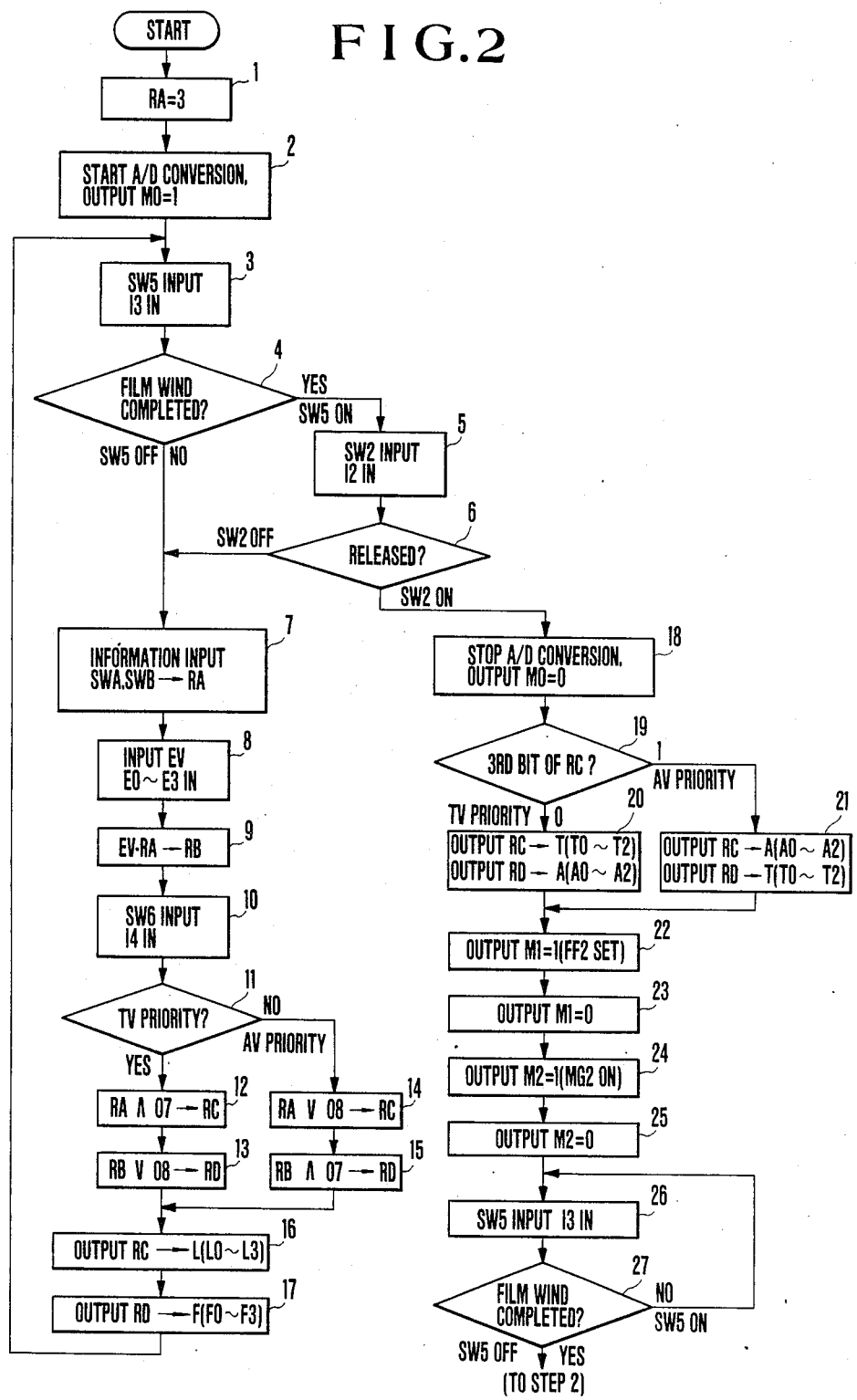
FIG. 2 is a flowchart for a program of the microcomputer of FIG. 1.
Figure 3:
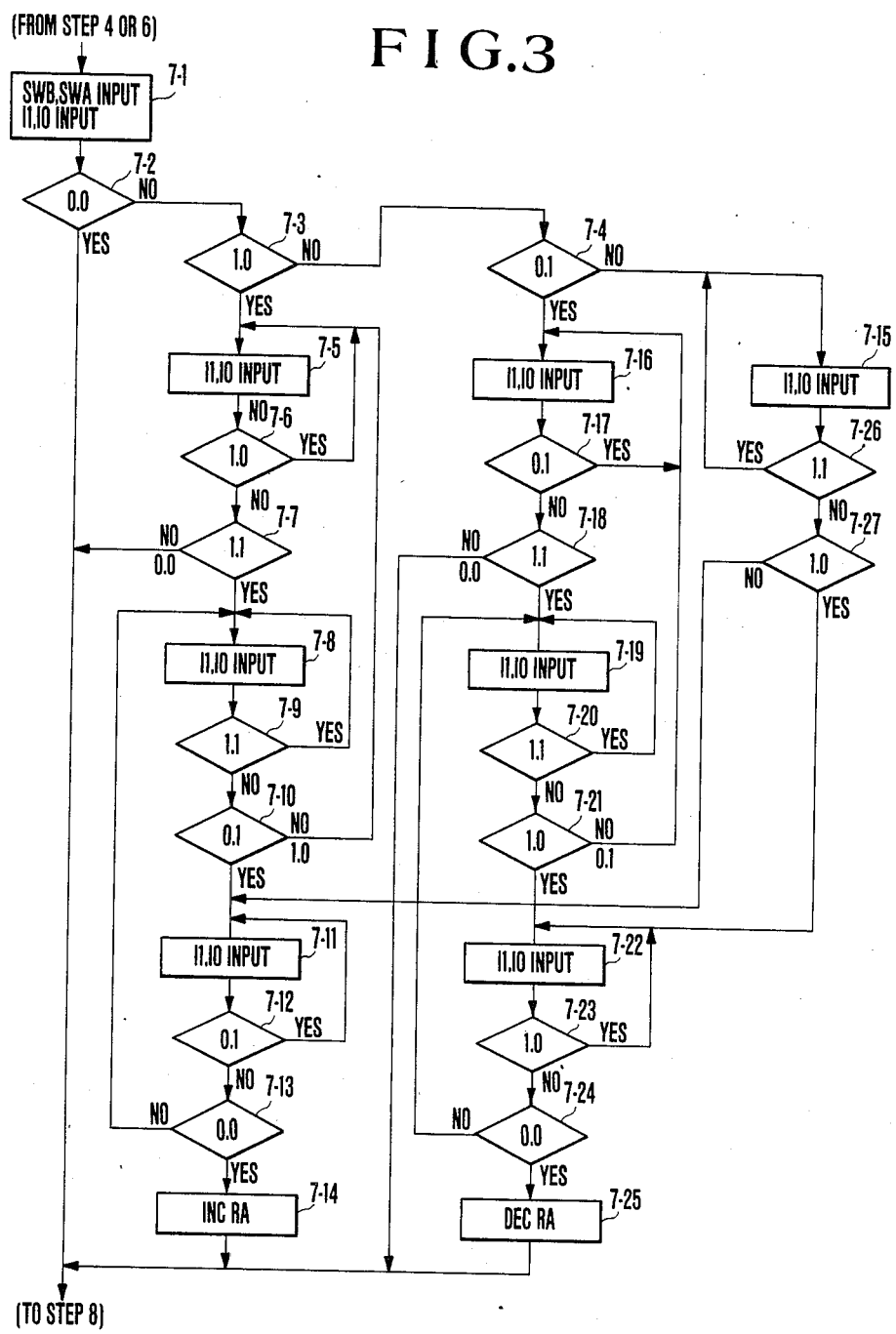
FIG. 3 is a flowchart for a program in Step 7 of FIG. 2.
Figure 8:
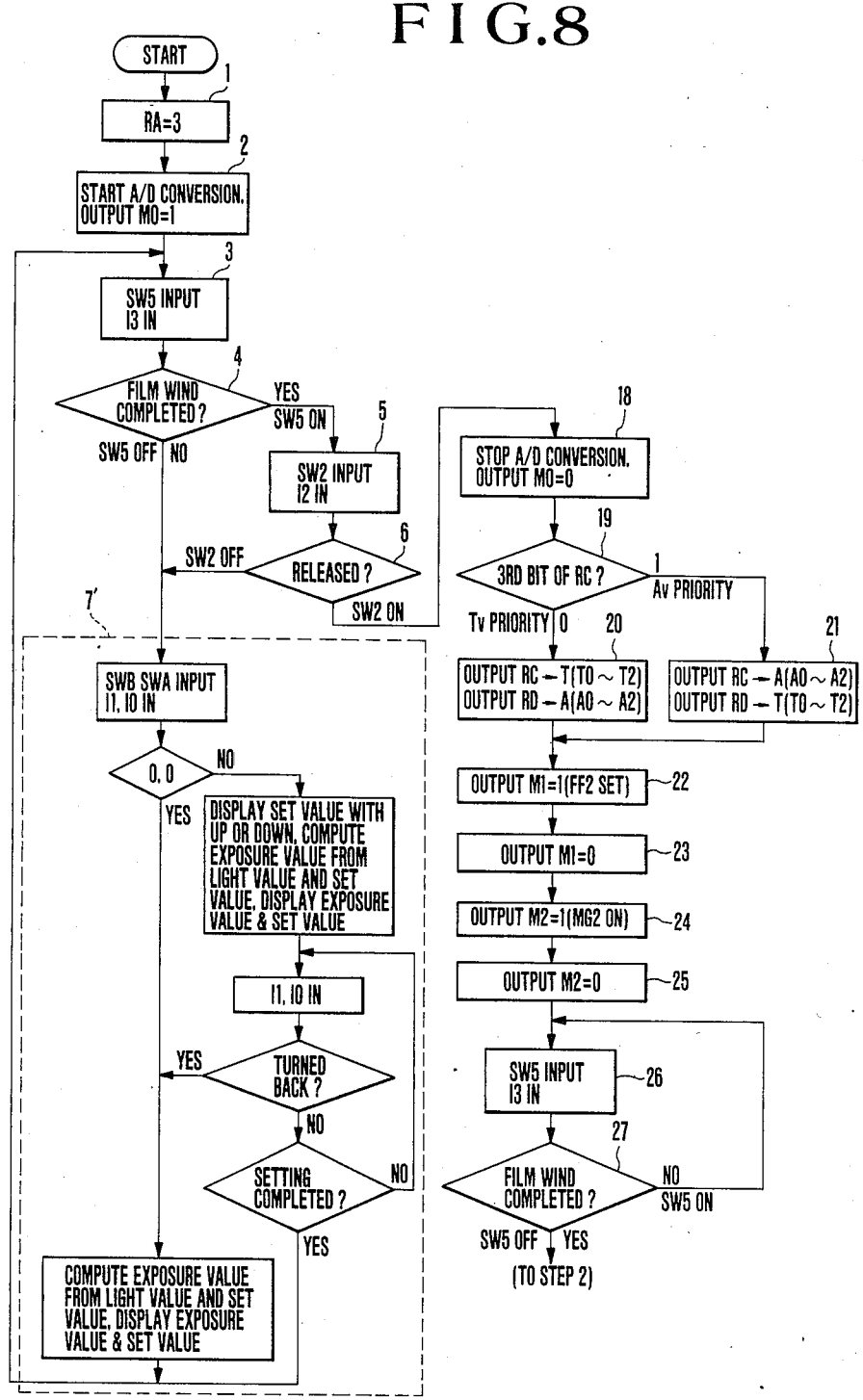
FIG. 8 is a flowchart for the program used in a second embodiment where actuation of a camera release is allowed to proceed only when the selecting member is in any of the clicked positions.
Figure 9:
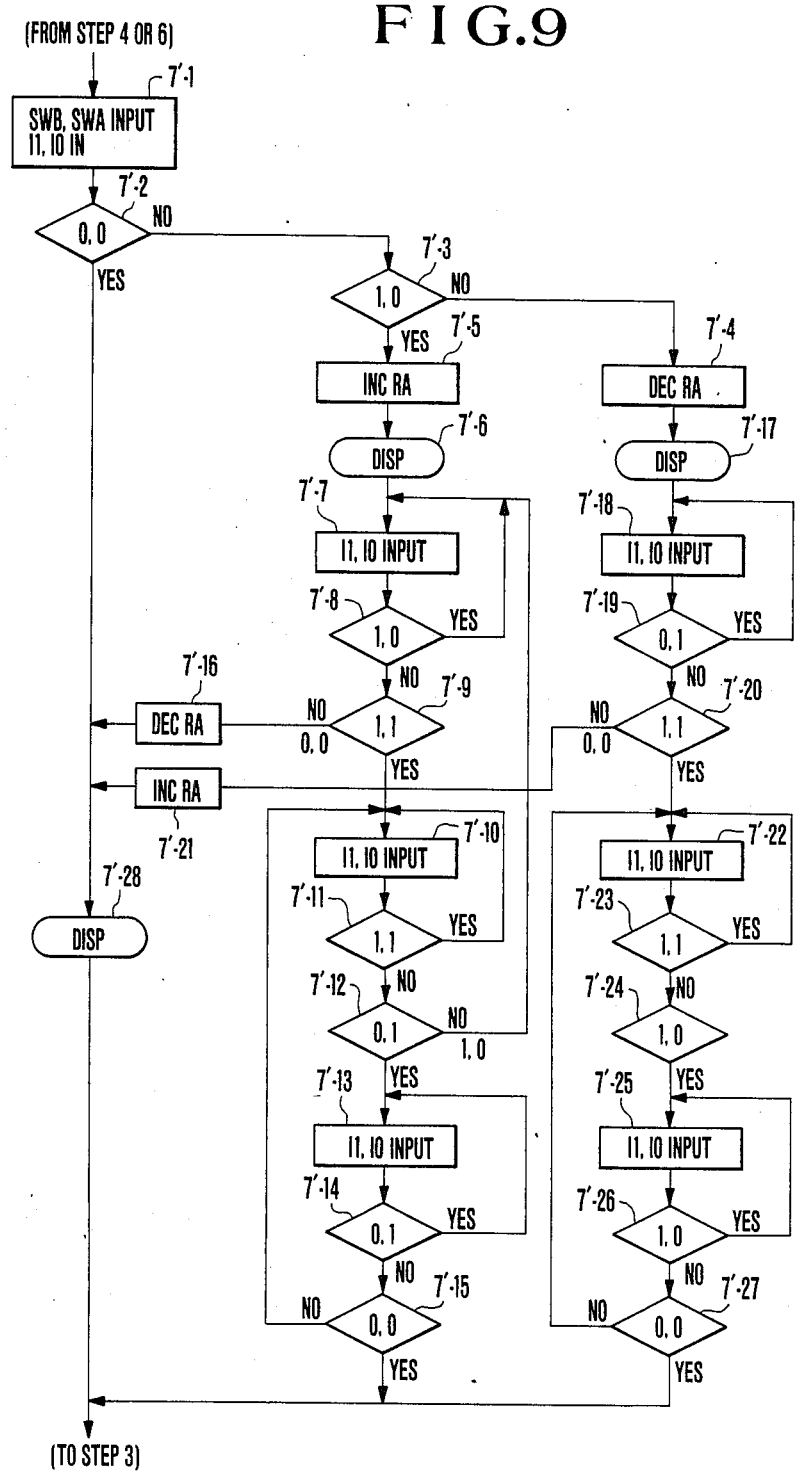
FIG. 9 is a flowchart illustrating the details of Step 7' of FIG. 8.

In this embodiment, FIG. 8 corresponds to FIG. 2 of the foregoing embodiment, and FIG. 9 corresponds to FIG. 3 of the same.

FIGS. 8 and 9 are flowcharts of the second embodiment, and those of the steps which are similar in behavior and operation to the flow shown in FIG. 2 are referred to by the same numerals and their explanation is not given.

In the following, explanation about the flow charts of FIGS. 8 and 9 is made.

The content of Step 7' is, as shown in FIG. 8, that if the content of the input ports I1, I0 is 0,0, the light value and the set value of exposure factor are computed to obtain an exposure value, and the exposure value and the set value of exposure factor are displayed. If the content of the input ports I1, I0 is not 0,0, the direction in which the selector dial is turned is examined to increment or decrement the initially set value. The thus-set value is then computed with the light value to obtain an exposure value. The exposure value and the set value are displayed. If the selector dial is turned back before it reaches the next click-stopped position, the set value is returned to that value which had been taken before the up or down was carried out. This set value and the exposure value are displayed. As is obvious from the flow of determining whether the setting is completed, if the selector dial, after having been turned away from one click-stopped position, does not yet reach the next click-stopped position, the step of determining whether or not the setting is completed, and the next step of "I1, I0, IN" are endlessly rotated and do not enter the next flow. Therefore, even when the shutter button is depressed to the second stroke, a flow for the actual exposure operation beginning with Step 18 is never executed. Next using FIG. 9, the content of Step 7' is described in detail.

Step 7'-1: Whether or not the switches SWA and SWB are ON is examined from the information of the input ports I1, I0.

Step 7'-2: If the signals of the input ports I1, I0 both are 0,0 because the dial is click-stopped as shown in FIG. 6A, Step 7'-28 follows. If not 0,0, the flow is branched to Step 7'-3.

Step 7'-3: The test to determine whether the input ports I1, I0 are 1,0, or the SWB is OFF and SWA is ON. Here, the up mode is operated by turning the dial in the forward direction. Therefore, the dial changes its phase of rotation from "a" to "b", so that the input port I1, I0 change from 0,0 to 1,0. If the input ports I1, I0 are 1,0, Step 7'-5 follows. If the input ports I1, I0 are not 1,0, the dial is verified to have turned in the reversed direction, or to have operated in the down mode, and the flow is branched to Step 7'-4.

Step 7'-5: 1 is added to the content of the register RA. On assumption that the program was executed from the start, because the content of the register RA was set to 3 in Step 1, the content of the register RA is incremented by one to 4.

Step 7'-6: A subroutine for display DISP is executed to display the light value and the signal of the mode selector switch SW6. This subroutine is the same as the routine consisting of Steps 8 to 17, and, therefore, no more explanation is given here.

Step 7'-7: I0, are again input.

Step 7'-8: The test to determine whether the dial is of phase "b". If so, return to Step 7'-7. So long as the dial is in phase "b", a loop of Steps 7'-7 and 7'-8 is repeated. This is carried out for the purpose of compensating the moving speed of the dial because the dial is moved manually.

Here, when the dial is further turned in the forward direction with a change of the phase from "b" to "c" of FIG. 6B, the input ports I1, I0 change from 1,0 to 1,1.

Step 7'-9: Whether or not the dial is further turned in the forward direction is, therefore, examined by the test to determine whether the input ports I1, I0 is 1,1. If it is here that the dial is turned backward, the input ports I1, I0 return from 1,0 to 0,0, and does not become 1,1. Therefore, the flow transfers to Step 7'-16. If the dial is turned in the forward direction, the input ports become 1,1, and Step 7'-10 follows.

Steps 7'-11 and 7'-12: Whether or not the dial is further turned is examined likewise as in Steps 7'-7 and 7'-8. By further turning the dial in the forward direction, as shown from phase "c" to phase "d" of FIG. 6B, the input ports I1, I0 are changed from 1,1 to 0,1. Therefore, whether or not the dial is further turned in the forward direction is examined by the test to determine whether the input ports I1, I0 are 0,1. If the dial is here turned backward, the input ports return from 1,1 to 1,0, causing the phase b-discrimination routine or Step 7'-7 to be executed. If the dial is turned in the forward direction, the input ports change from 1,1 to 0,1 causing the flow to transfer to Step 7'-13.

Steps 7'-14 and 7'-15: Whether or not the dial is turned is examined likewise as in Steps 7'-10 and 7'-11 and Steps 7'-7 and 7'-8. By further turning the dial in the forward direction until it comes to a click-stopped position, as shown from phase "d" to phase "e" of FIG. 6B, the input ports I1, I0 are changed from 0,1 to 0,0. Therefore, whether or not the dial is further turned in the forward direction is examined by the test to determine whether the input port I1, I0 are 0,0. If the dial is here turned backward, the input ports I1, I0 return from 0,1 to 1,1, causing the phase "c" discrimination routine or Step 7'-10 to be executed. If the dial is turned forward, the input ports I1, I0 change from 0,1 to 0,0, causing the flow to transfer to Step 3.

Step 7'-16: If the input ports I1, I0 was verified in Step 7'-9 not to be 1,1, that is, the phase "c" of FIG. 6B, the dial was determined to be returned on the way. Therefore, the content of the register RA which had been obtained by carrying out incrementation by one in Step 7'-5, became incorrect. Now a command "DEC RA" for subtracting 1 from the content of the register RA is carried out to return the content of the register RA to the initial one.

Step 7'-21: Likewise as the command of Step 7'-16 in the flow from Step 7'-3 to Step 7'-15, if the dial was returned on the way in the flow from Step 7'-4 to Step 7'-27, the content of the register RA which had been obtained by carrying out a command "DEC RA" of Step 7'-4 to subtract 1 from the content of the register RA became incorrect. Therefore, a command "INC RA" for adding 1 to the content of the register RA is now carried out to return the content of the register RA to the initial one.

Step 7'-28: A routine that follows Step 7'-2 or a similar subroutine DISP to that of Step 7'-6 or Step 7'-16 is carried out to display the computed value.

Also in Step 7'-3, if the input ports are not 1,0, or the phase "b" of FIG. 6B, there are three possible cases, one of which is that the dial was turned backward to the phase "d", another one of which is that the dial was turned from the phase "a" past the phase "b" to the phase "c", and the other of which is that the dial was turned backward from the phase "a" past the phase "d" to the phase "c". Since the CPU, how executes the program at a very high speed, now matter how fast the dial is moved by hand, there is little possibility for the CPU to execute the program of FIG. 8 as skipping over one step between the steps for the phases "a" and "c". In Step 7'-2, therefore, after the input ports I1, I0 have been verified to be 0,0 in one sequence when, in the next sequence, the input ports I1, I0 are verified not to be 0,0, the dial is often found at the phase "b" or the phase "d" as changed from the phase "a". Therefore, if, in Step 7'-3, the input ports are determined not to be the phase "b", whether or not the input ports become 0,1, or the phase "d" is examined. If the dial is here determined to be in the phase "d", the flow transfers to Step 7'-16. If not, the flow transfers to Step 7'-15.

A flow from Step 7'-4 to Step 7'-27 that is the test to determine whether the down mode is operated is similar to the flow from Step 7'-5 to Step 7'-15 that is the test to determine whether the up mode is operated, except the discrimination commands, and, therefore, no more detailed explanation is given here.

As a result, the selector dial must be turned until any of the click-stopped positions is reached. Or otherwise, the CPU could not escape from the flow of FIG. 9 and execute the next sequence. In other words, even when the shutter button is pushed down to the second stroke, actuation of a shutter release is hindered from succeeding.

When the selector dial is set in the click-stopped position, the flow of FIG. 9 transits to Step 3 of FIG. 8. If the camera is not in the cocked position, the flow "Step 3→Step 4→Step 7'" is repeated. With the camera not in the cocked position, if the release button is not yet pushed down from the first to the second stroke, the flow "Step 3→Step 4→Step 5→Step 6→Step 7'" is repeated. After the camera has been cocked, i.e. the shutter button is pushed to the second stroke, the flow is branched from Step 6 to Step 18.

An explanation about the subsequent flow from Step 18 to Step 27 is omitted.

As has been described above, in the embodiment, when the photographic information selecting member is in the click position, release actuation is hindered, Therefore, the display of the photographic information is made to change when the selecting member is only slightly moved. Therefore, the user when selecting photographic information can perceive which of the step-up and step-down of the photographic information is effected without having to move the selecting member by an unduly long distance. An advantage is, therefore, that when to select a desired photographic information, as the user mistakes the direction of rotation of the selecting member, for example, the initial setting which should be stepped up is stepped down, the user can soon recognize his faulty operation.

As has been described above, according to this embodiment, the information selecting member is provided with click means for preventing the set value from being changed when the user unintentionally moves the information selecting member while carrying out operations other than the selecting one. Another feature is that the depression of the shutter release button to the second stroke leads to actuate a camera release only when the information selecting member is stabilized by the click means against unexpected touches thereon. When shooting therefore, the photographer is freed from accidental changes of the set value of photographic information and can make as right an exposure as he intends. When in the manual exposure mode, the possibility of making an under-exposure or an over-exposure which would be otherwise resulted when the photographer is unaware of the accidental change of the set value can be largely reduced. Thus, a camera that enables the photographer to make always as good an exposure as he intends can be realized.

As has been described above, according to the present invention, in the information setting device for the camera, in which the initial setting is incremented or decremented by discriminating the phase of two signals of different phase from each other with the same period produced in response to manual operation of a photographic information selecting member, there is provided a control means for allowing the set value to be altered when the photographic information selecting member is moved by a distance equal to at least a half of the period of said two signals, thereby giving an advantage that the display of the set value is prevented from flickering which would be otherwise caused to occur when the information selecting member is turned back and forth frequently in short strokes, and, therefore, the manageability is greatly improved.

What is claimed is:

1. A camera comprising:
   (a) a dial-shaped setting member for setting a photographic information;
   (b) signal forming means for producing two signals of different phase from each other depending on the direction of rotation of said setting member;
   (c) control means for incrementing and decrementing the set photographic information depending on the phase difference of the two signals produced from said signal forming means;
   (d) clicks provided on said setting member, said clicks being positioned at locations at which said photographic information increments and decrements.
   (e) detecting means for detecting that said setting member is in a click position; and
   (f) prohibiting means responsive to no detection of the fact that said setting member is in the click position by said detecting means for prohibiting actuation of a camera release.

2. A camera comprising:
   (a) a dial-shaped setting member for setting a photographic information, said member including clicks;

(b) signal forming means for producing two signals of different phase from each other depending on the direction of rotation of said setting member;
(c) detecting means for detecting that said setting member is in any of the click positions;
(d) control means for incrementing or decrementing the set photographic information depending on the phase difference of the two signals produced from said signal forming means, said means renewing the set photographic information when said detecting means detects that said setting member reaches any of the click positions; and
(e) prohibiting means for prohibiting actuation of a camera release when said detecting means does not detect that said setting member is in any of the click positions.

3. A photographic information setting device for a camera, comprising:
(a) a rotationally operable member for setting photographic information, said member being provided with renewing positions for renewing the photographic information for each prescribed rotation;
(b) detecting means for detecting shifting of said member to said renewing positions;
(c) set information value shifting means for increasing or decreasing a set information value to shift it to another information value different from the heretofore set information value when shifting of said member to the renewing position is detected by said detecting means; and
(d) a control circuit for inhibiting a information value changing action of said shifting means in response to a detection action of said detecting means in the case where said member returns to a start renewing position before said member shifts to a next renewing position if said member has already started shifting from said start renewing position to said next renewing position, and for permitting an information value changing action by said shifting means in response to a detection action of said detecting means when said member shifts from a start renewing position to a next renewing position.

4. A camera according to claim 3, wherein said shifting means increases the set information value when the operable member shifts in one direction from a start renewing position to a next renewing position, and decrease the set information value when the operable member shifts in a reverse direction from a start renewing position to a next renewing position.

5. A photographic information setting device for a camera, comprising:
(a) a rotationally operable member for setting photographic information, said member being provided with renewing positions for renewing the photographic information for each prescribed rotation;
(b) signal forming means for forming output signals corresponding to positions of said member, said means being arranged for forming, in turn, a first output signal and at least a second output signal and a third output signal as said member rotates from a start renewing position, in a first direction, and shifts toward a next renewing position, then thereafter forming said first output signal when said member has shifted into said next renewing position, said means being arranged for forming, in turn, the first output signal and at least said third and second output signals as said member rotates from said renewing position, in a second direction reverse to the first direction, and shifts toward another next renewing position, then thereafter forming the first output signal when said member has shifted into said another next renewing position; and
(c) an information setting circuit for detecting the output signals of said signal forming means and for shifting a heretofore set value to another set value when the first output signal is produced as a next signal after the above mentioned third output signal is formed during a period of time before the first output signal is again indicated when the second output signal is indicated as a next signal after the output signal indicates the first output signal; and
(d) said circuit being arranged to shift the heretofore set value to another set value when the first output signal is produced as a next signal after the above mentioned second output signal is formed during a period of time until the first output signal is indicated again at a time when the third output signal is indicated as a next signal after the above mentioned output signal indicates the first output signal so that when the second output signal is formed subsequent to the first output signal the first output will not be formed subsequent to the third output signal, then when the first output signal is again formed and when the third output signal is formed subsequent to the first output signal the first output signal will not be formed subsequent to the second output signal, and when the first output signal is formed again the set value will not be changed.

6. A camera according to claim 5, wherein said information setting circuit increases the set value when the output of the signal forming means changes again to the first output after having changed through the first, second and third outputs, and decreases the set value when the output of the signal forming means changes again to the first output after having changed through the first, third and second outputs.

7. A camera comprising:
(a) rotationally operable member;
(b) signal forming means forming signals which indicate and set information represented by a rotating direction and a rotating position of said operable member by operating said rotationally operable member;
(c) control means for detecting a signal from said signal forming means and controlling incrementing or decrementing of the set information, wherein said operable member has a stable position at which a signal state of said signal forming means is made as a specified state, and said control means is arranged to increment and decrement the set information when said signal exhibits the specified state, and
(d) prohibiting means for allowing a release action of the camera when said operable member is at said stable position and prohibiting the release action when it is not at the stable position.

8. A camera according to claim 7, wherein said rotationally operable member is a dial.

9. A camera comprising:
(a) rotationally operable member:
(b) signal forming means forming signals which indicate a rotating direction and a rotating position of said operable member by operating said rotationally operable member;

(c) control means for detecting a signal from said signal forming means and for controlling incrementing or decrementing of set information, wherein said operable member has a stable position at which said signal forming means indicates a specific value, said signal forming means changing its output from said specific value in a predetermined sequence to a next specific value while said operable member shifts from said stable position to a next stable position and said control means detecting that the output of said signal forming means has shifted from said specific value to said next specific value in a predetermined sequence to cause incrementing or decrementing of the set information; and (d) prohibiting means for allowing a release action of the camera when said operable member is at said stable position and prohibiting the release action when it is not at the stable position.

10. A camera according to claim 9, wherein said rotationally operable member is a dial.

* * * * *